(12) United States Patent
Slaughter et al.

(10) Patent No.: US 10,288,108 B2
(45) Date of Patent: May 14, 2019

(54) METHODS FOR MANIPULATING SWAGING COLLARS

(71) Applicant: The Boeing Company, Chicago, IL (US)

(72) Inventors: Ryan R. Slaughter, Seattle, WA (US); Stuart J. Fallon, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/037,013

(22) Filed: Jul. 17, 2018

(65) Prior Publication Data
US 2018/0320728 A1 Nov. 8, 2018

Related U.S. Application Data

(62) Division of application No. 14/827,382, filed on Aug. 17, 2015, now Pat. No. 10,113,580.

(51) Int. Cl.
B23Q 1/00 (2006.01)
F16B 39/02 (2006.01)
B21J 15/02 (2006.01)
F16B 19/05 (2006.01)

(52) U.S. Cl.
CPC .......... *F16B 39/026* (2013.01); *B21J 15/022* (2013.01); *F16B 19/05* (2013.01)

(58) Field of Classification Search
CPC ......... B23P 11/00; B23P 11/022; B23P 19/02; B23P 19/062; B23Q 1/28; B23Q 3/06; F16B 2/00; F16B 2/20; F16B 5/00
See application file for complete search history.

(56) References Cited

U.S. PATENT DOCUMENTS 4,852,376 A 8/1989 Suhov
10,113,580 B2* 10/2018 Slaughter .............. F16B 39/026
2017/0051777 A1* 2/2017 Slaughter .............. F16B 39/026

* cited by examiner

Primary Examiner — Lee D Wilson
(74) Attorney, Agent, or Firm — McDonnell Boehnen Hulbert & Berghoff LLP

(57) ABSTRACT

A method of delivering a collar between a fastener and a swager is provided. The method comprises steps of: (i) advancing the collar from a collar source to a collar feeder, where the collar source is operatively coupled to the collar feeder via a collar-supply tube, (ii) presenting the collar at an outlet of the collar feeder concentrically in line with a central axis of the fastener and with a working axis of the swager, and (iii) retaining the collar at the outlet of the collar feeder using at least one resilient flexure of the collar feeder.

20 Claims, 14 Drawing Sheets

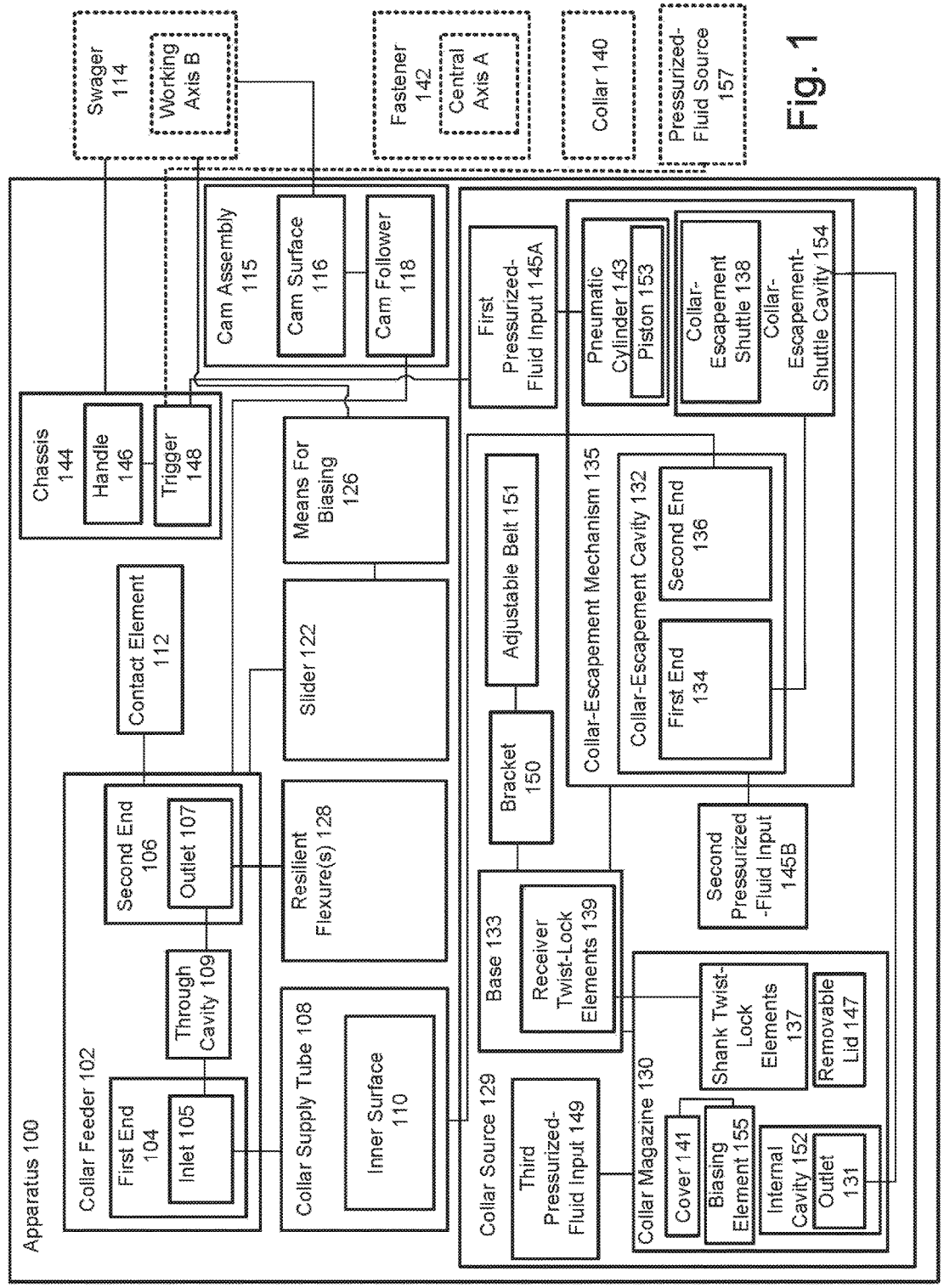

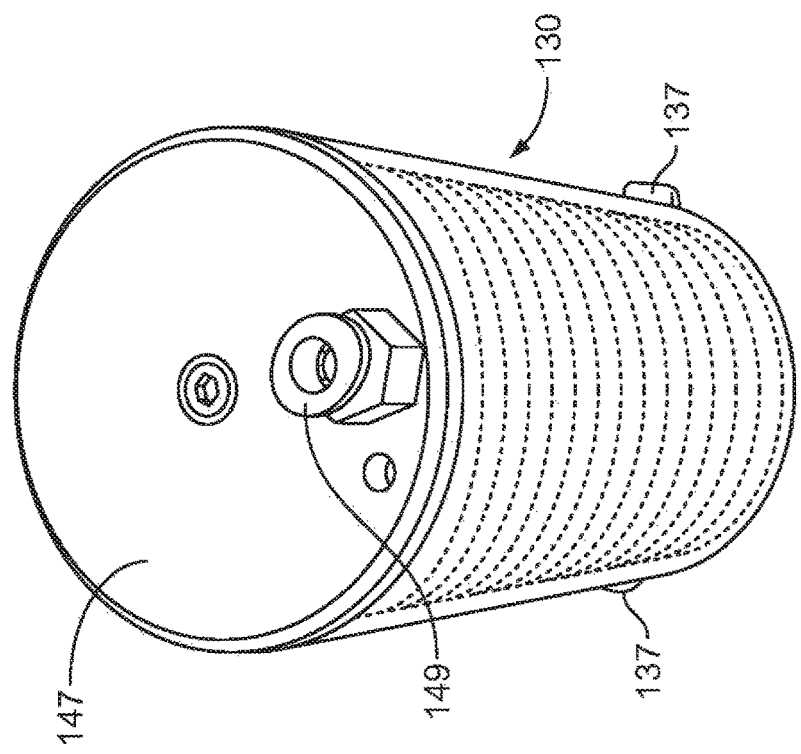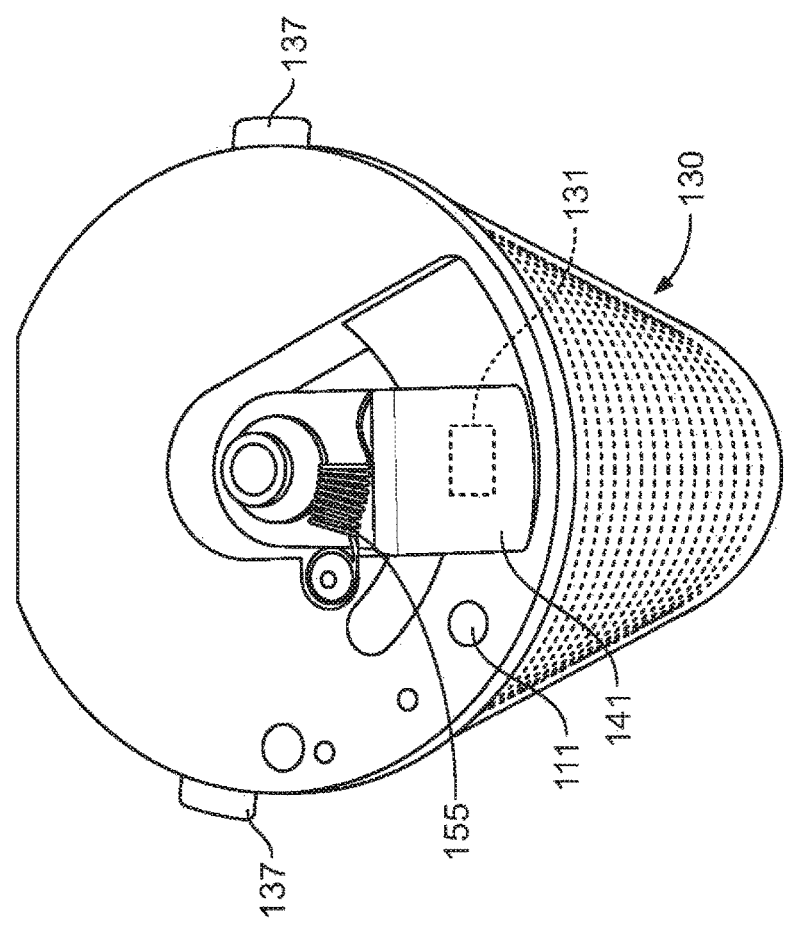

METHODS FOR MANIPULATING SWAGING COLLARS

CROSS-REFERENCE TO RELATED APPLICATIONS

This is a divisional application that claims the benefit of the filing date of U.S. Non-Provisional patent application Ser. No. 14/827,382, now U.S. Pat. No. 10,113,580, filed on Aug. 17, 2015, the contents of which are hereby incorporated by reference.

BACKGROUND

Presenting a collar for swaging to a fastener is typically done by hand or by using a sealant to temporarily attach the collar to the fastener. When collars are presented to the fastener by hand, operator error may lead to fallen collars that create foreign object debris in the work area. If excess sealant is used for temporary attachment of a collar to a fastener before a swaging operation, sealant trapped between the collar and the lock grooves of the fastener during swaging may cause the swaged connection to experience excessive stress.

SUMMARY

Accordingly, apparatuses and methods, intended to address at least the above-identified concerns, would find utility.

The following is a non-exhaustive list of examples, which may or may not be claimed, of the subject matter according the present disclosure.

One example of the present disclosure relates to an apparatus for delivering a collar concentrically in line with a central axis of a fastener and a working axis of a swager. The apparatus comprises a collar feeder comprising a first end, a second end, an inlet at the first end, an outlet at the second end, and a through cavity in communication with the inlet and the outlet. The apparatus also comprises a contact element, located at the second end of the collar feeder, and a cam surface, configured to be stationary relative to the swager. The apparatus additionally comprises a cam follower coupled to the collar feeder. The cam surface is configured to guide the cam follower and the cam follower is configured to be moveable along the cam surface. The apparatus further comprises a slider, pivotally coupled to the collar feeder. The slider is movable relative to the swager along the working axis of the swager. The apparatus also comprises means for biasing the slider relative to the swager along the working axis of the swager and at least one resilient flexure, coupled to the collar feeder at the outlet.

Another example of the present disclosure relates to a method of delivering a collar between a fastener and a swager. The method comprises advancing the collar from a collar source to a collar feeder. The collar source is operatively coupled to the collar feeder via a collar-supply tube. The method also comprises presenting the collar at an outlet of the collar feeder concentrically in line with a central axis of the fastener and with a working axis of the swager. The method additionally comprises retaining the collar at the outlet of the collar feeder using at least one resilient flexure of the collar feeder.

Yet another example of the present disclosure relates to a method of swaging a collar to a fastener associated with a workpiece. The method comprises presenting the collar at an outlet of a collar feeder concentrically in line with a central axis of the fastener and with a working axis of a swager. The method also comprises retaining the collar at the outlet of the collar feeder using at least one resilient flexure of the collar feeder. The method further comprises installing the collar around the fastener and releasing the collar from the at least one resilient flexure by moving the swager toward the workpiece along the central axis of the fastener to cause the outlet of the collar feeder to move away from the central axis of the fastener. The method additionally comprises swaging the collar to the fastener.

BRIEF DESCRIPTION OF THE DRAWINGS

Figure 2A:
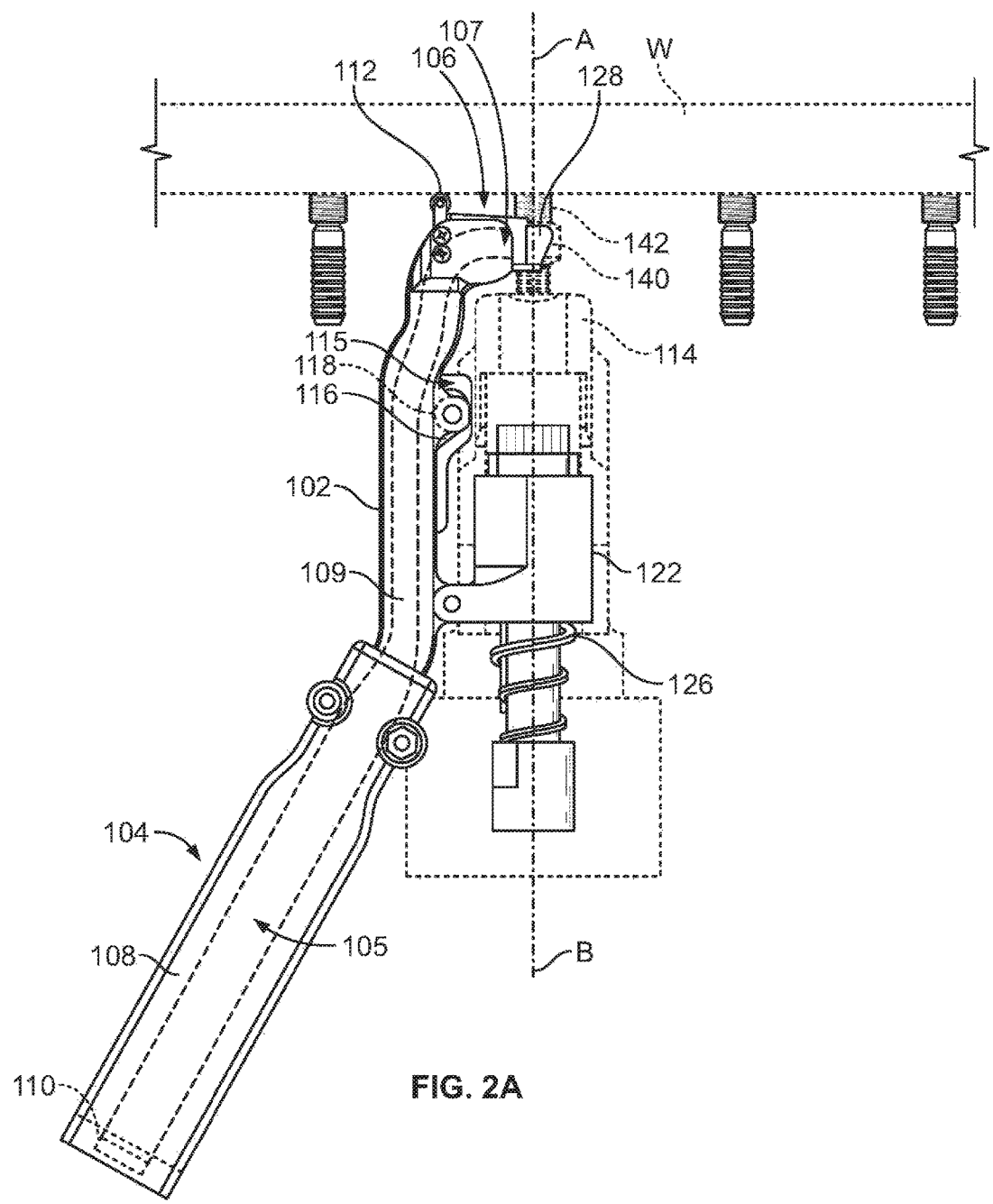
Figure 2B:
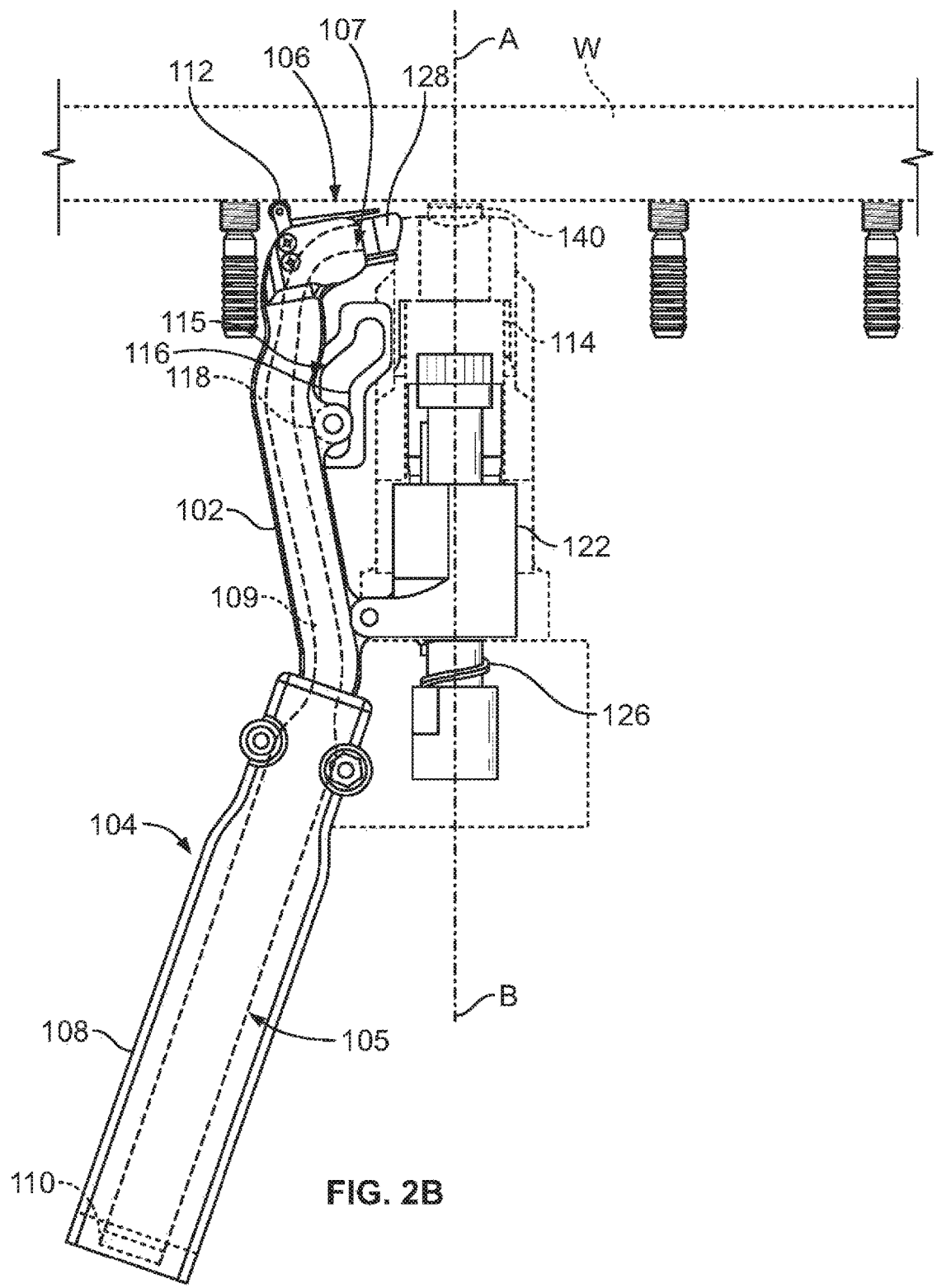
Figure 3:
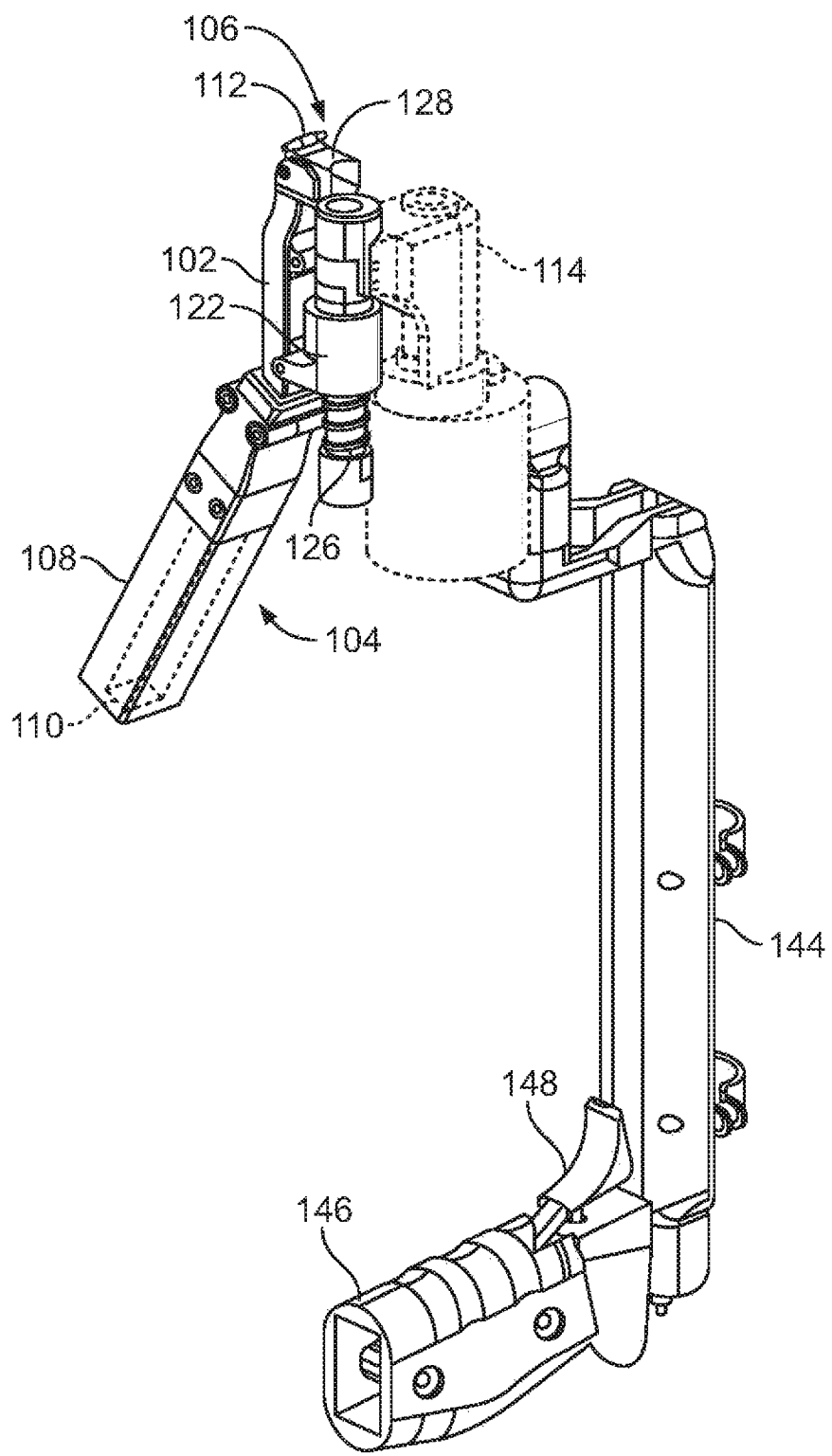
Figure 4A:
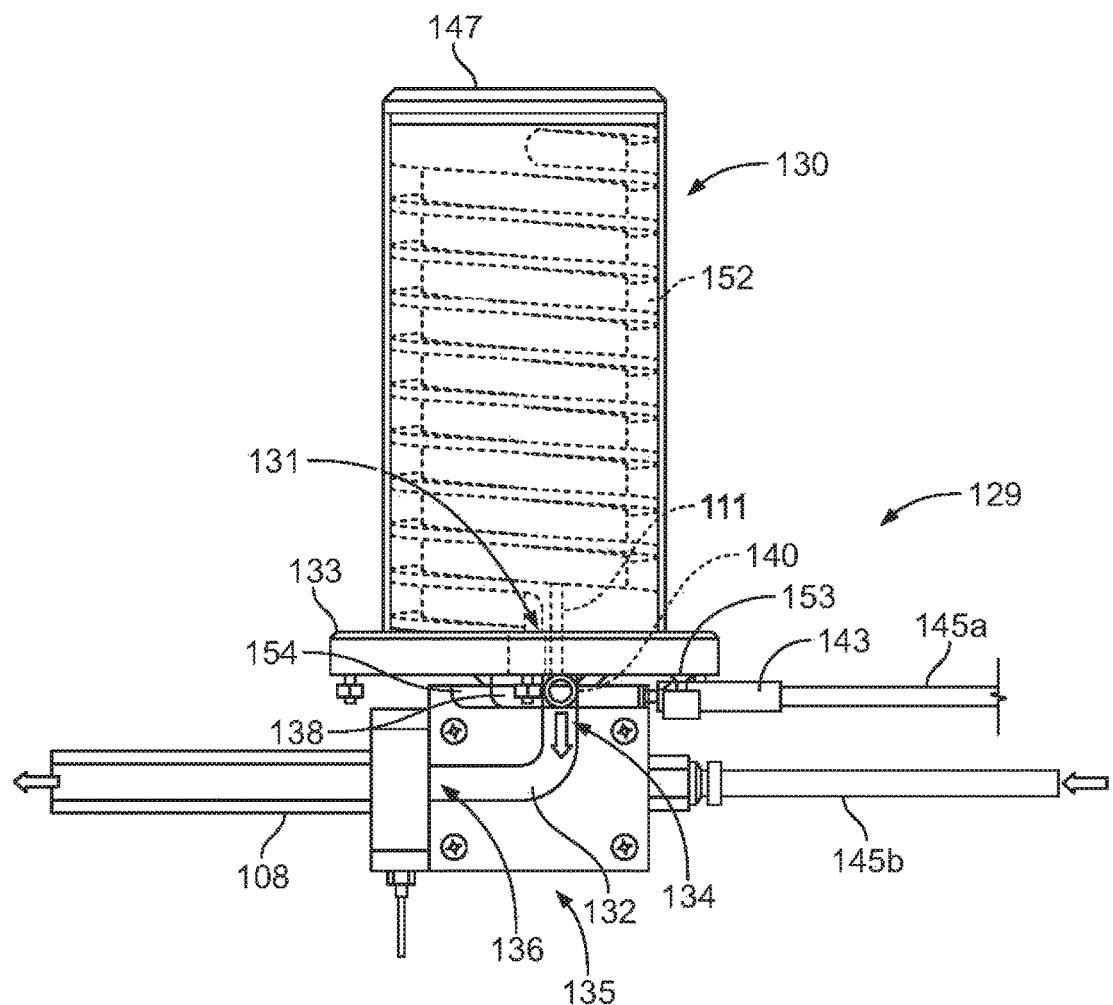
Figure 4B:
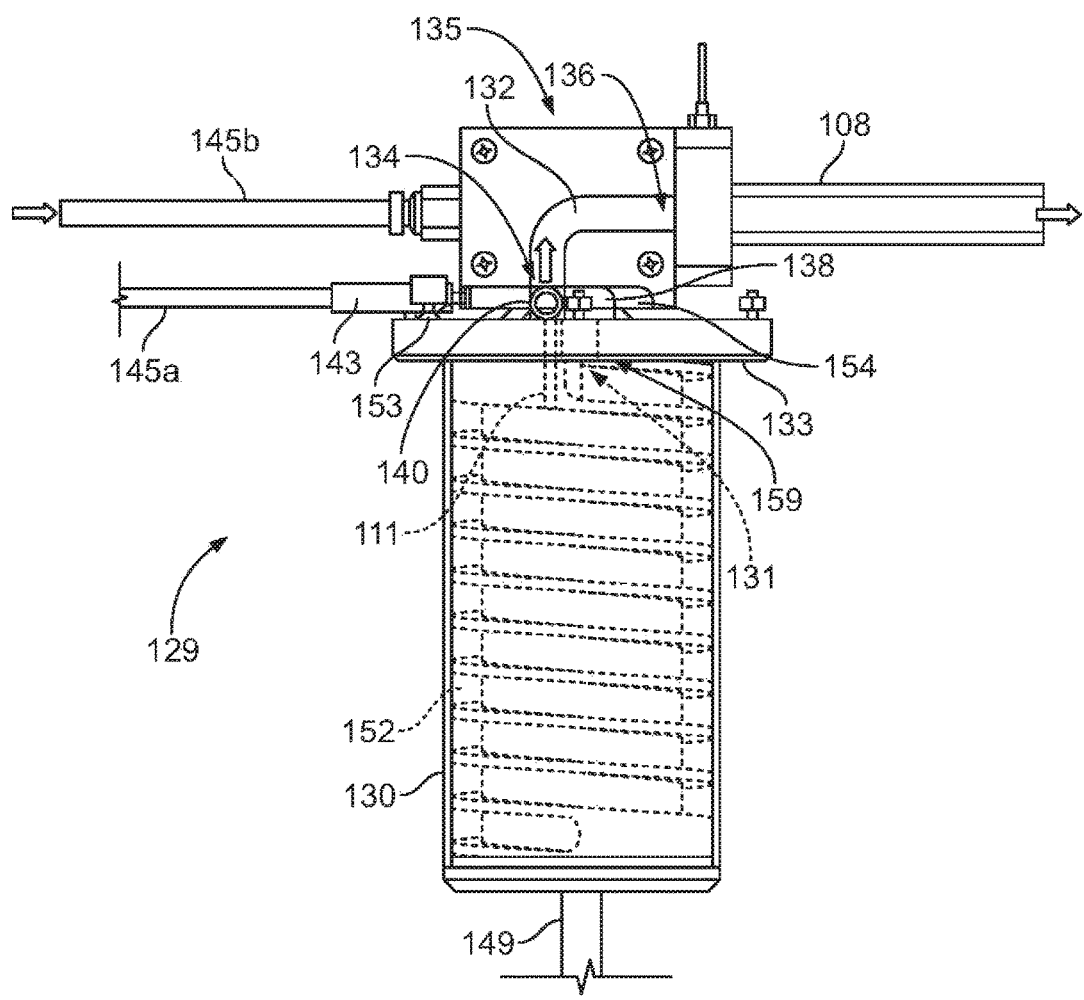
Figure 4C:
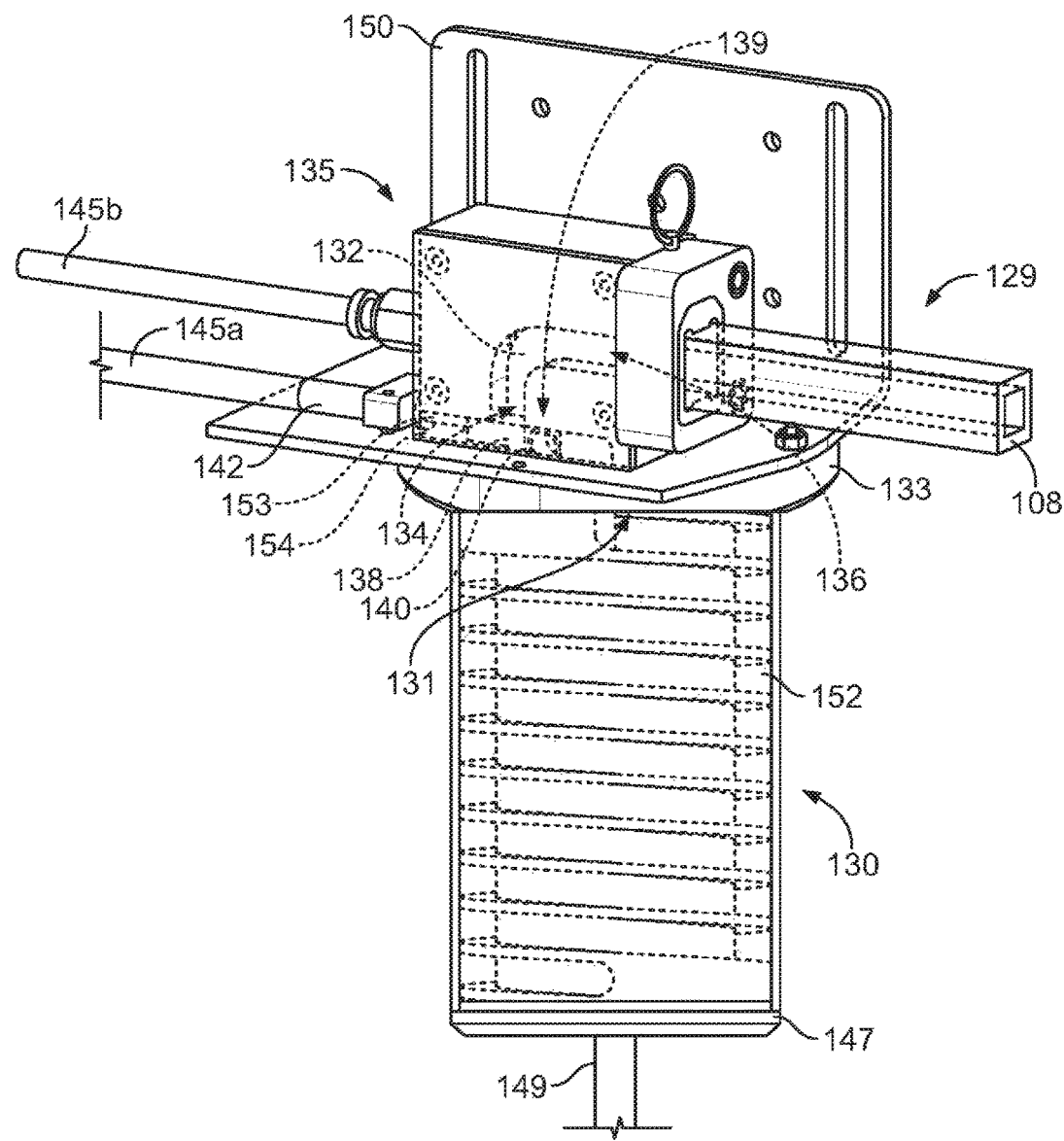
Figure 4G:
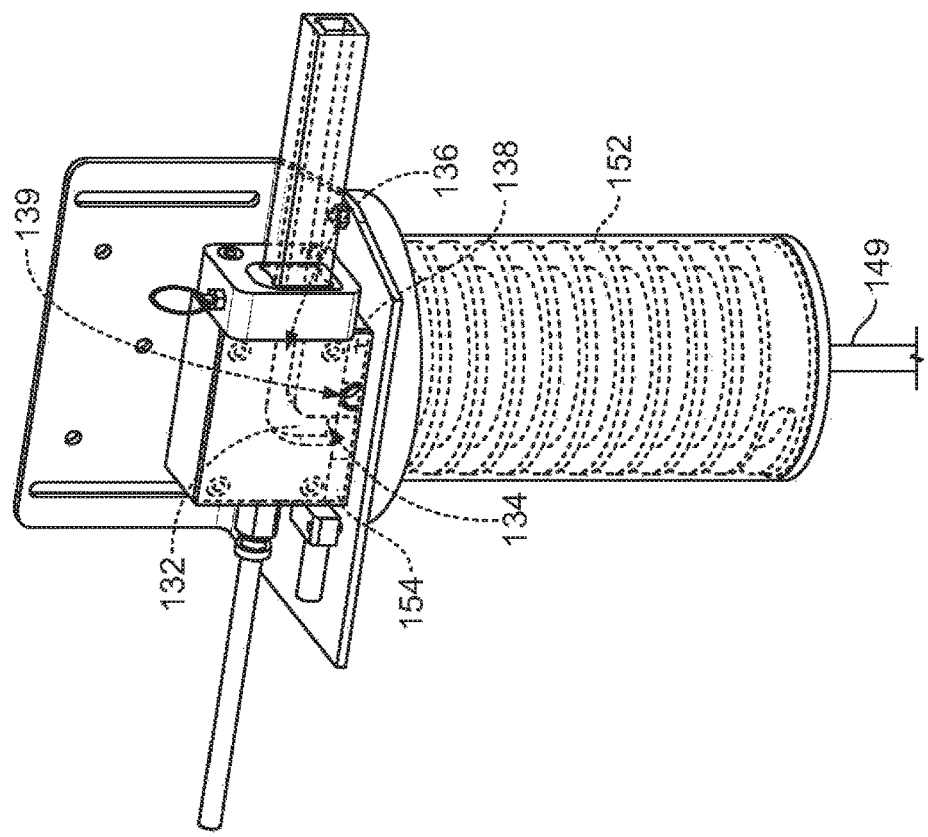
Figure 4F:
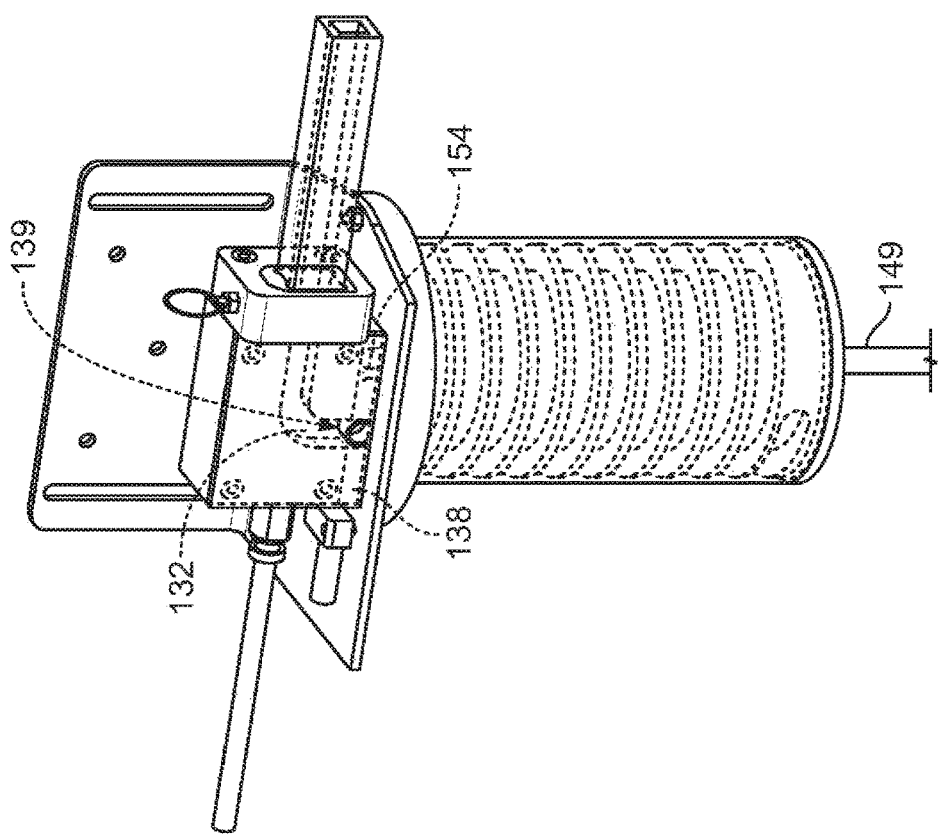
Figure 4H:
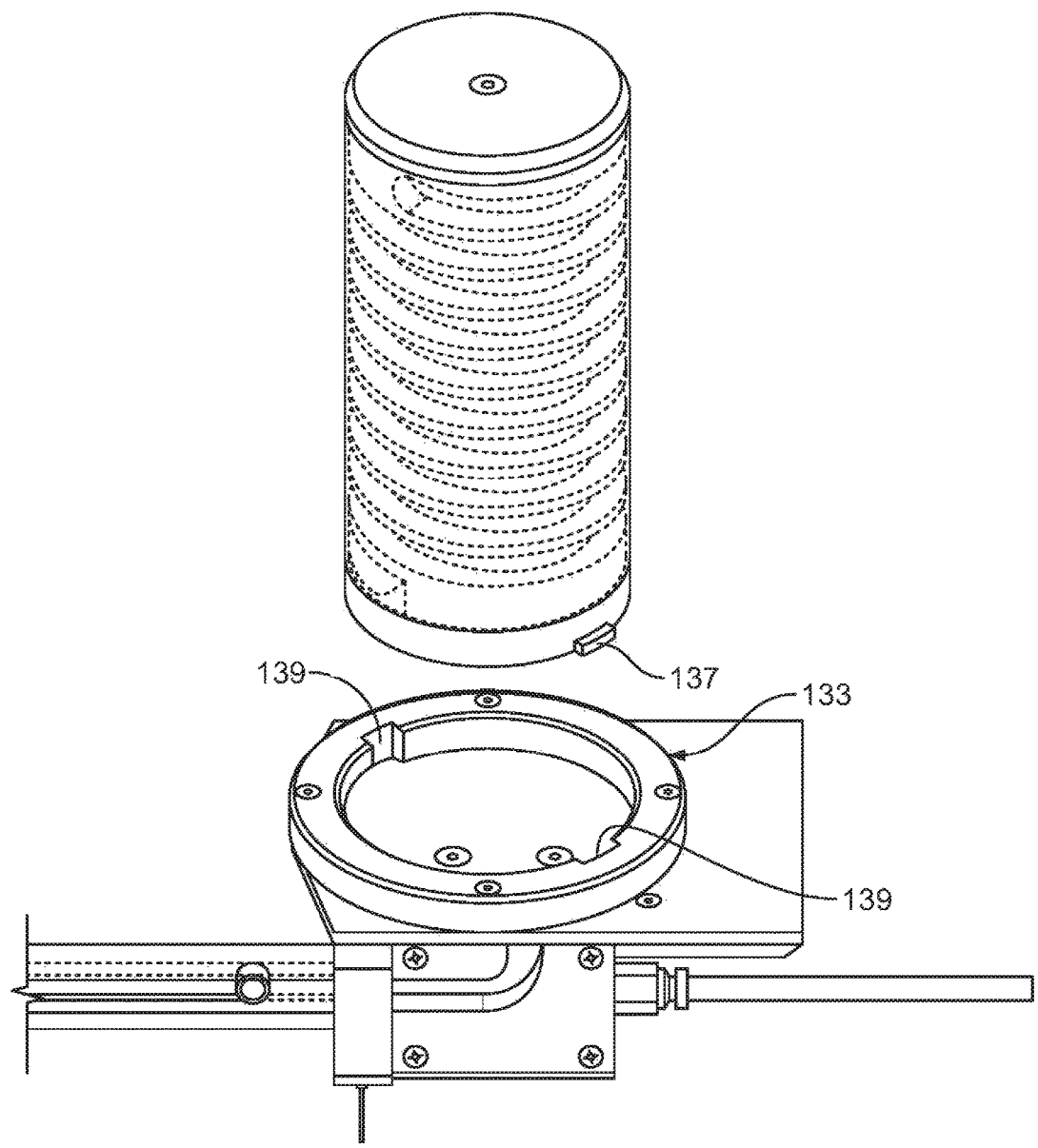
Figure 5:
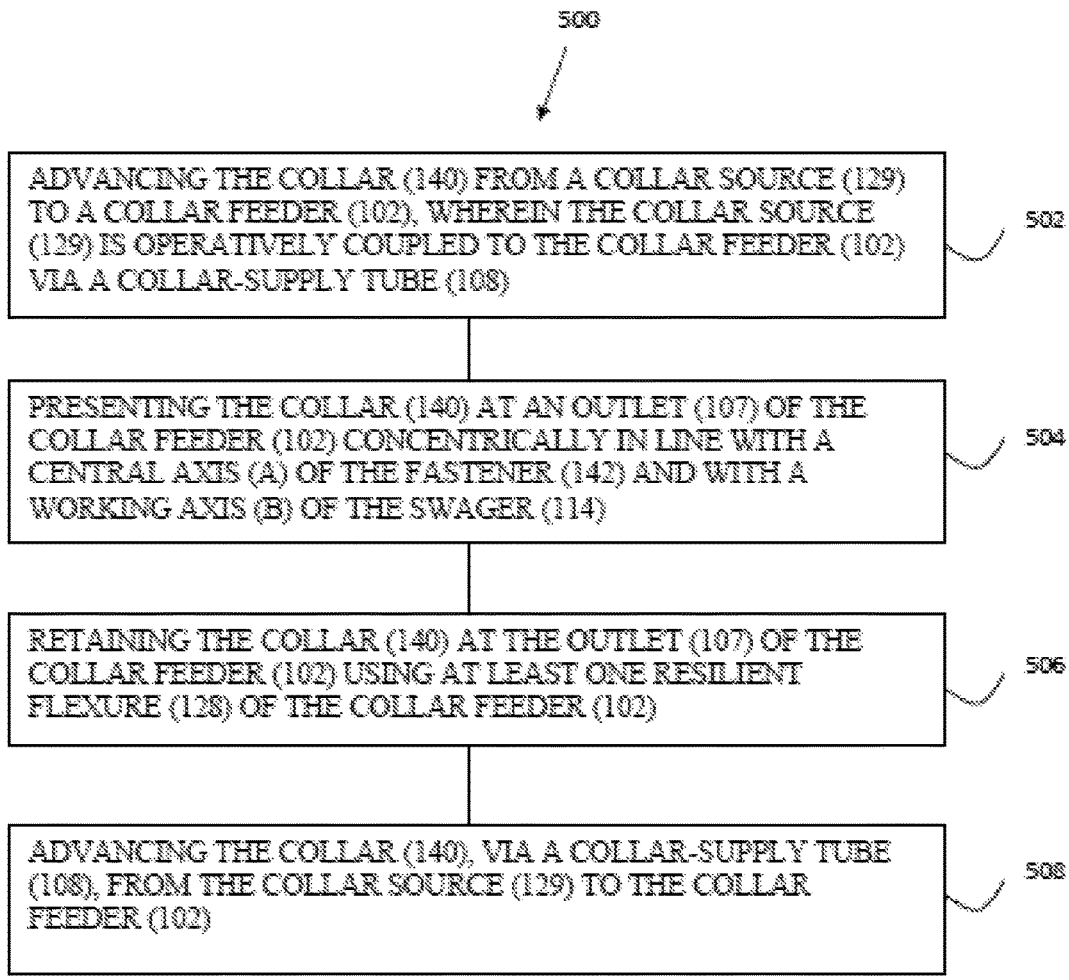
Figure 6:
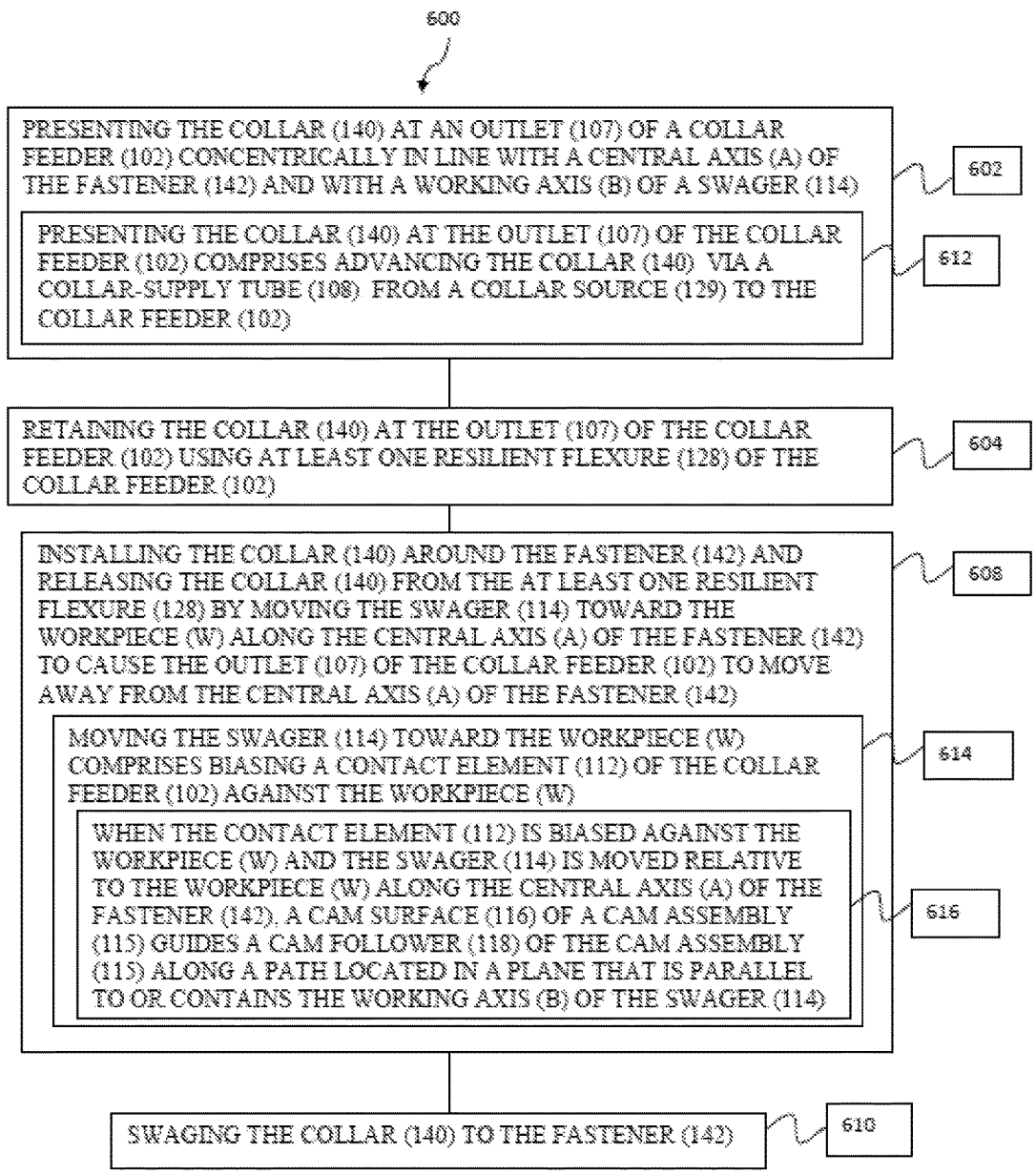
Figure 7:
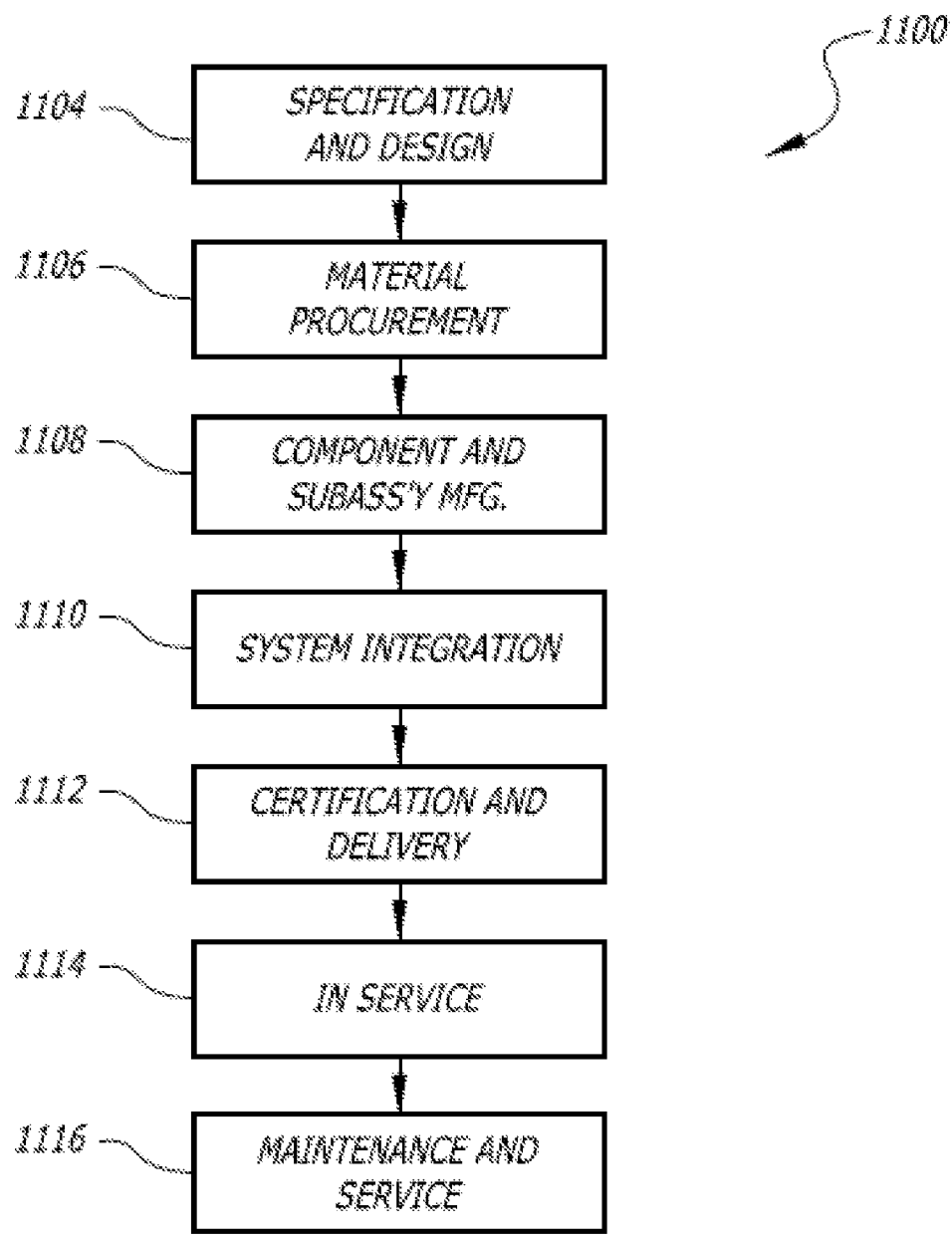

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of an apparatus, according to one or more examples of the present disclosure;

FIG. 2A is a schematic, side elevation, environmental view of the apparatus of FIG. 1, according to one or more examples of the present disclosure;

FIG. 2B is a schematic, side elevation, environmental view of the apparatus of FIG. 1, according to one or more examples of the present disclosure;

FIG. 3 is a schematic perspective view of the apparatus of FIG. 1, according to one or more examples of the present disclosure;

FIG. 4A is a schematic, side elevation, environmental view of a collar source of the apparatus of FIG. 1, according to one or more examples of the present disclosure;

FIG. 4B is a schematic, side elevation, environmental view of a collar source of the apparatus of FIG. 1, according to one or more examples of the present disclosure;

FIG. 4C is a schematic perspective view of a collar source of the apparatus of FIG. 1, according to one or more examples of the present disclosure;

FIG. 4D is a schematic perspective view of a collar magazine of the apparatus of FIG. 1, according to one or more examples of the present disclosure;

FIG. 4E is a schematic perspective view of a collar magazine of the apparatus of FIG. 1, according to one or more examples of the present disclosure;

FIG. 4F is a schematic perspective view of a collar source of the apparatus of FIG. 1, according to one or more examples of the present disclosure;

FIG. 4G is a is a schematic perspective view of a collar source of the apparatus of FIG. 1, according to one or more examples of the present disclosure;

FIG. 4H is a schematic perspective exploded view of a collar source of the apparatus of FIG. 1, according to one or more examples of the present disclosure;

FIG. 5 is a block diagram of a method of delivering a collar between a fastener and a swager, according to one or more examples of the present disclosure;

FIG. 6 is a block diagram of a method of swaging a collar to a fastener associated with a workpiece, according to one or more examples of the present disclosure;

FIG. 7 is a block diagram of aircraft production and service methodology; and

Figure 8:
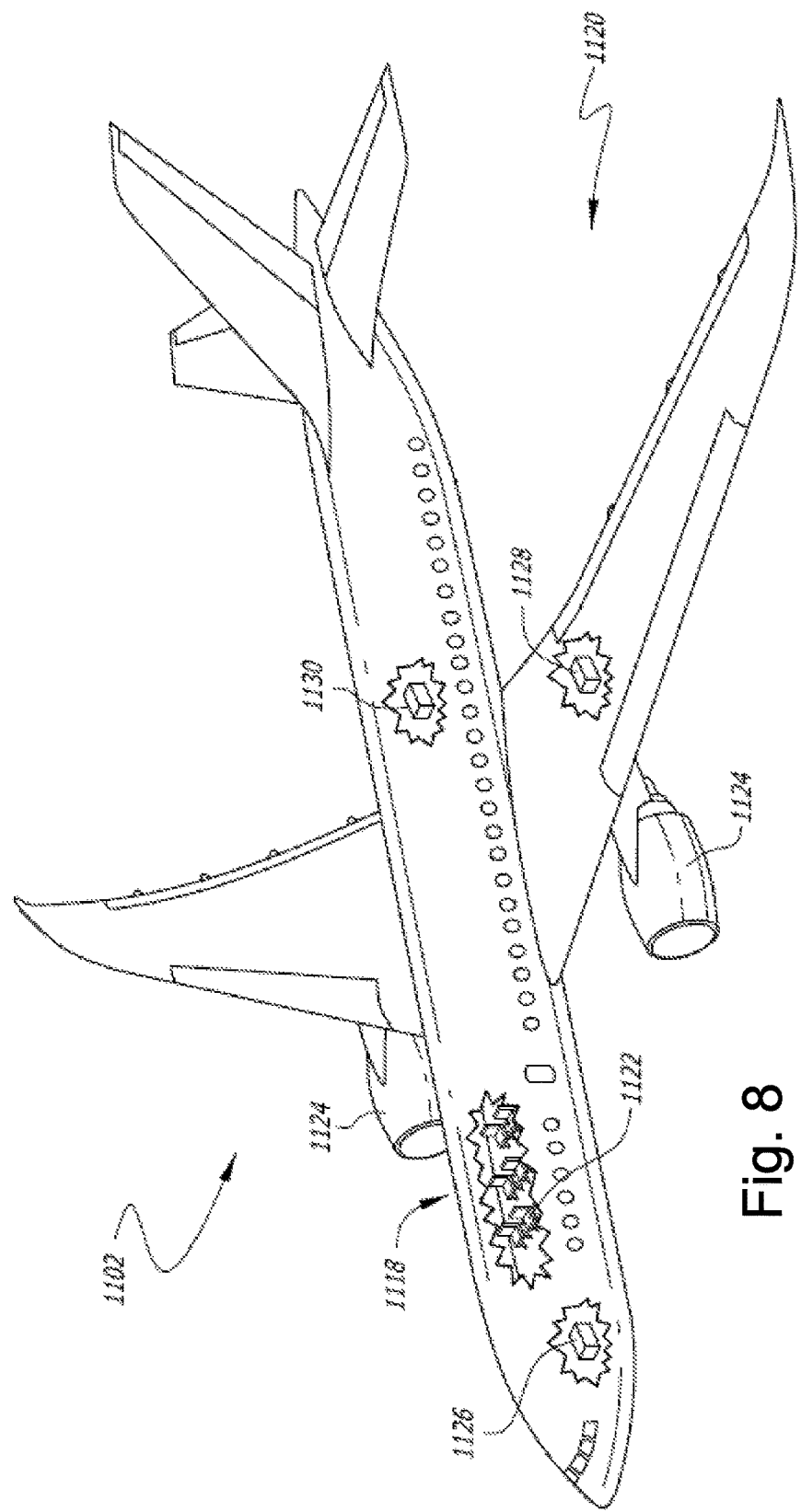

FIG. 8 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 5-7, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 5-7 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

Referring, e.g., to FIGS. 1, 2A, and 2B, apparatus 100 for delivering collar 140 concentrically in line with central axis A of fastener 142 and working axis B of swager 114, is disclosed. Apparatus 100 comprises collar feeder 102, comprising first end 104, second end 106, inlet 105 at first end 104, outlet 107 at second end 106, and through cavity 109 in communication with inlet 105 and outlet 107. Apparatus 100 also comprises contact element 112, located at second end 106 of collar feeder 102, and cam surface 116, configured to be stationary relative to swager 114. Apparatus 100 further comprises cam follower 118 coupled to collar feeder 102. Cam surface 116 is configured to guide cam follower 118 and cam follower 118 is configured to be moveable along cam surface 116. Apparatus 100 additionally comprises slider 122, pivotally coupled to collar feeder 102. Slider 122 is movable relative to swager 114 along working axis B of swager 114. Apparatus 100 also comprises means for biasing 126 slider 122 relative to swager 114 along working axis B of swager 114 and at least one resilient flexure 128, coupled to collar feeder 102 at outlet 107. The preceding subject matter of this paragraph characterizes example 1 of the present disclosure.

Apparatus 100 provides improved ergonomics for overhead work because collar 140 is presented to the work location concentrically in line with swager 114. Thus, collar 140 is already lined up with the work location. Further, collar feeder 102 may be held in an operator's left hand and swager 114 in the other hand. When working with fasteners overhead limited-access areas, it is easier to control apparatus 100 when using both hands. Chassis 144 and handle 146 of apparatus 100 allow the operator to use their shoulder muscles as opposed to weaker wrist and lower arm muscles to position apparatus 100, thereby reducing operator fatigue.

Means for biasing 126 slider 122 relative to swager 114 may, for example, include a spring. The spring may be a coil spring, a leaf spring, a conical or undulating washer, such as a Belleville washer, or still another mechanical, metallic, or resilient elastomeric spring arrangement. Alternatively, instead of or in addition to a mechanical spring, means for biasing 126 may include a gas spring or a magnetic repulsion arrangement. Means for biasing 126 may include an active or powered element, such as a solenoid, a pneumatic or hydraulic cylinder, or a finger, lever, gear, wedge, or other mechanical element moved under power to bias slider 122 relative to swager 114.

As used herein, a central axis of an object, such as a non-planar surface or a surface having circumferentially closed cross-sections, is a line, which may or may not be straight, passing through the centroid of each cross-section of the object that is perpendicular to the medial skeleton of the object. A medial skeleton of an object is a set of points not on the object's boundary such that at least two points on the object's boundary are equidistant from and closest to each point of the set of points. The centroid (geometric center) of a two-dimensional region, such as a cross-section of an object, is the "average" position of all the points in the two-dimensional region.

Referring generally to FIG. 1 and particularly to, e.g., FIGS. 2A and 2B, cam follower 118 is movable relative to swager 114 along a path located in a plane that is parallel to or contains working axis B. The preceding subject matter of this paragraph characterizes example 2 of the present disclosure, wherein example 2 also includes the subject matter according to example 1, above.

Such a movement of cam follower 118 provides visibility of the work location, delivers better access to confined areas due to the reduced footprint of apparatus 100 and the initial alignment of collar feeder 102 with swager 114, and additionally provides an improved bearing surface to contact workpiece W.

Referring generally to FIG. 1 and particularly to, e.g., FIGS. 2A and 2B, the path of cam follower 118 is two-dimensional. The preceding subject matter of this paragraph characterizes example 3 of the present disclosure, wherein example 3 also includes the subject matter according to example 2, above.

The two-dimensional path of cam follower 118 promotes proper alignment of apparatus 100 to workpiece W.

Referring generally to FIG. 1 and particularly to, e.g., FIGS. 2A and 2B, contact element 112 comprises a roller. The preceding subject matter of this paragraph characterizes example 4 of the present disclosure, wherein example 4 also includes the subject matter according to any one of examples 1-3, above.

Such a roller may be biased against workpiece W in operation. In one example, when the roller is biased against workpiece W and swager 114 is moved relative to workpiece W along central axis A of fastener 142, cam surface 116 of cam assembly 115 guides cam follower 118 of cam assembly 115 along a path located in a plane that is parallel to or contains working axis B of swager 114. In another example, collar feeder 102 may be configured to cam out of the way of swager 114 pneumatically rather than from mechanical pressure against workpiece W.

Referring generally to FIG. 1 and particularly to, e.g., FIGS. 2A and 2B, cam follower 118 is rotationally coupled to collar feeder 102. The preceding subject matter of this paragraph characterizes example 5 of the present disclosure, wherein example 5 also includes the subject matter according to any one of examples 1-4, above.

The rotational coupling of cam follower 118 to collar feeder 102 enables collar feeder 102 to rotate out of the path of swager 114 during operation.

Referring generally to FIG. 1 and particularly to, e.g., FIGS. 2A and 2B, apparatus 100 further comprises collar-supply tube 108 coupled to first end 104 of collar feeder 102. The preceding subject matter of this paragraph characterizes example 6 of the present disclosure, wherein example 6 also includes the subject matter according to any one of examples 1-5, above.

Collar-supply tube 108 may be operatively coupled to collar source 129 to provide a plurality of collars to one or more resilient flexures 128 of collar feeder 102, as described in additional detail below.

Referring generally to FIG. 1 and particularly to, e.g., FIGS. 2A and 2B, collar-supply tube 108 comprises inner surface 110 having a rectangular cross-section. The preceding subject matter of this paragraph characterizes example 7 of the present disclosure, wherein example 7 also includes the subject matter according to example 6, above.

Such a cross-section may enable collar 140 to fit precisely within collar-supply tube 108, thus enabling delivery of collar 140 to resilient flexure 128 via a pressurized fluid in collar-supply tube 108.

Referring generally to FIG. 1 and particularly to, e.g., FIGS. 4A-4H, apparatus 100 further comprises collar source 129 operatively coupled to collar feeder 102 via collar-supply tube 108. The preceding subject matter of this paragraph characterizes example 8 of the present disclosure, wherein example 8 also includes the subject matter according to example 6, above.

Collar source 129 may be remote from collar feeder 102. For example, collar source 129 may be located at the operator's hip rather than at collar feeder 102 of apparatus 100 to decrease the weight of apparatus 100 supported by the operator and to decrease the footprint of apparatus 100 for better access to confined spaces.

Referring generally to FIG. 1 and particularly to, e.g., FIGS. 4A-4H, collar source 129 comprises collar magazine 130 comprising internal cavity 152, which comprises outlet 131. Collar source 129 also comprises collar-escapement mechanism 135, operatively coupled to collar magazine 130. The preceding subject matter of this paragraph characterizes example 9 of the present disclosure, wherein example 9 also includes the subject matter according to example 8, above.

Collar magazine enables the operator to store a plurality of collars in internal cavity 152, thereby enabling the operator to perform multiple swaging operations over a short period of time.

Referring generally to FIG. 1 and particularly to, e.g., FIGS. 4A-4H, collar-escapement mechanism 135 comprises collar-escapement-shuttle cavity 154. Collar-escapement mechanism 135 also comprises collar-escapement shuttle 138, moveable between a first position and a second position within collar-escapement-shuttle cavity 154. Collar-escapement shuttle 138 comprises through opening 139. Through opening 139 of collar-escapement shuttle 138 is communicatively coupled with internal cavity 152 of collar magazine 130 when collar-escapement shuttle 138 is in the first position within collar-escapement-shuttle cavity 154. Through opening 139 of collar-escapement shuttle 138 is decoupled from internal cavity 152 of collar magazine 130 when collar-escapement shuttle 138 is in the second position within collar-escapement-shuttle cavity 154. Collar-escapement mechanism 135 further comprises collar-escapement cavity 132, which comprises first end 134 and second end 136. First end 134 of collar-escapement cavity 132 is communicatively coupled with through opening 139 of collar-escapement shuttle 138 when collar-escapement shuttle 138 is in the second position within collar-escapement-shuttle cavity 154. First end 134 of collar-escapement cavity 132 is decoupled from through opening 139 of collar-escapement shuttle 138 when collar-escapement shuttle 138 is in the first position within collar-escapement-shuttle cavity 154. Second end 136 of collar-escapement cavity 132 is communicatively coupled with collar-supply tube 108. The preceding subject matter of this paragraph characterizes example 10 of the present disclosure, wherein example 10 also includes the subject matter according to example 9, above.

Collar-escapement mechanism 135 couples collar magazine 130, which may include a plurality of collars, to collar feeder 102. As discussed above, separating collar magazine 130 from collar feeder 102 reduces the weight of apparatus 100 supported by the operator and to decrease the footprint of apparatus 100 for better access to confined spaces.

Referring generally to FIG. 1 and particularly to, e.g., FIGS. 4A-4H, apparatus 100 further comprises pneumatic cylinder 143 comprising piston 153 attached to collar-escapement shuttle 138. Pneumatic cylinder 143 also comprises first pressurized-fluid input 145A, selectively operatively coupled with pneumatic cylinder 143, and second pressurized-fluid input 145B, communicatively coupled with collar-escapement cavity 132 and collar-supply tube 108. The preceding subject matter of this paragraph characterizes example 11 of the present disclosure, wherein example 11 also includes the subject matter according to example 10, above.

First pressurized-fluid input is selectively operatively coupled with pneumatic cylinder 143 to cause piston 153 of pneumatic cylinder 143 to move collar-escapement shuttle 138 from the first position to the second position or from the second position to the first position within collar-escapement-shuttle cavity 154. Second pressurized-fluid input is communicatively coupled with collar-escapement cavity 132 and collar-supply tube 108 to transport collar 140 from collar-escapement cavity 132 to resilient flexures 128 of collar feeder 102.

Referring generally to FIG. 1 and particularly to, e.g., FIG. 3, apparatus 100 further comprises chassis 144, configured to be coupled to swager 114. Chassis 144 comprises handle 146 and trigger 148, coupled to handle 146. Trigger 148 is configured to selectively pneumatically couple pneumatic cylinder 143 to pressurized-fluid source 157 to cause piston 153 of pneumatic cylinder 143 to move collar-escapement shuttle 138 from the first position to the second position or from the second position to the first position within collar-escapement-shuttle cavity 154. The preceding subject matter of this paragraph characterizes example 12 of the present disclosure, wherein example 12 also includes the subject matter according to example 11, above.

Chassis 144 may be shaped to permit two-handed use. Handle 146 is ergonomic for ease in operator handling. After trigger 148 is released, trigger logic will cause collar 140 to be sent up from collar source 129 to collar feeder 102 using pressure from pressurized-fluid source 157 to be presented in front of swager 114.

Referring generally to FIG. 1 and particularly to, e.g., FIGS. 4A-4H, collar source 129 further comprises base 133, coupled to collar-escapement mechanism 135. Collar magazine 130 is removably coupled to base 133. The preceding subject matter of this paragraph characterizes example 13 of the present disclosure, wherein example 13 also includes the subject matter according to any one of examples 10-12, above.

Collar magazine 130 may be removable such that an operator can quickly replace collar magazine 130 when all of the collars have been used. In addition, collar magazine 130 may be refilled with additional collars when collar magazine is removed from base 133.

Referring generally to FIG. 1 and particularly to, e.g., FIGS. 4A-4H, collar magazine 130 further comprises shank twist-lock elements 137. Base 133 comprises receiver twist-lock elements 139, configured to receive shank twist-lock elements 137 of collar magazine 130 to removably couple collar magazine 130 to base 133 such that outlet 131 of collar magazine 130 is aligned with collar-escapement-shuttle cavity 154 when collar magazine 130 is coupled to base 133. The preceding subject matter of this paragraph characterizes example 14 of the present disclosure, wherein example 14 also includes the subject matter according to example 13, above.

Such shank twist-lock elements 137 and receiver twist-lock elements 139 allow for quick coupling and decoupling of collar magazine 130 to base 133. Other coupling mechanisms are possible as well, such as a threaded connection between collar magazine 130 and base 133.

Referring generally to FIG. 1 and particularly to, e.g., FIGS. 4A-4H, collar magazine 130 further comprises cover 141 configured such that outlet 131 of internal cavity 152 of collar magazine 130 is open when collar magazine 130 is coupled to base 133 and such that outlet 131 is closed when collar magazine 130 is decoupled from base 133. The preceding subject matter of this paragraph characterizes example 15 of the present disclosure, wherein example 15 also includes the subject matter according to example 14, above.

Cover 130 prevents collars from exiting collar magazine 130 when collar magazine 130 is separated from base 133.

Referring generally to FIG. 1 and particularly to, e.g., FIGS. 4A-4H, collar magazine 130 further comprises biasing element 155 that moves cover 141 so that outlet 131 of internal cavity 152 is closed when collar magazine 130 is decoupled from base 133. The preceding subject matter of this paragraph characterizes example 16 of the present disclosure, wherein example 16 also includes the subject matter according to example 15, above.

Biasing element 155 may comprise a spring, a pneumatic piston, or some other biasing mechanism. Biasing element 155 thereby keeps cover 130 positioned over outlet 131 to prevent collars from exiting collar magazine 130 when collar magazine 130 is separated from base 133, for example, during shipping or other transport of collar magazine 130.

Referring generally to FIG. 1 and particularly to, e.g., FIG. 4A, collar magazine 130 is positioned vertically above collar-escapement mechanism 135 to cause collar 140 to be transferred, via gravity, from internal cavity 152 of collar magazine 130 to collar-escapement-shuttle cavity 154 of collar-escapement mechanism 135 when collar-escapement shuttle 138 is in the first position within collar-escapement-shuttle cavity 154 and to cause collar 140 to be transferred, via gravity, from collar-escapement-shuttle cavity 154 of collar-escapement mechanism 135 to collar-escapement cavity 132 of collar-escapement mechanism 135 when collar-escapement shuttle 138 is in the second position within collar-escapement-shuttle cavity 154. The preceding subject matter of this paragraph characterizes example 17 of the present disclosure, wherein example 17 also includes the subject matter according to any one of examples 13-16, above.

Collar 140 thereby moves through internal cavity 152 to collar-escapement-shuttle cavity via gravity, and without additional pressurized-fluid input.

Referring generally to FIG. 1 and particularly to, e.g., FIGS. 4B-4H, apparatus 100 further comprises third pressurized-fluid input 149 operatively connected with collar magazine 130 to cause collar 140 to be transferred, via pressurized fluid, from internal cavity 152 of collar magazine 130 to collar-escapement-shuttle cavity 154 of collar-escapement mechanism 135 when collar-escapement shuttle 138 is in the first position within collar-escapement-shuttle cavity 154 and to cause collar 140 to be transferred, via pressurized fluid, from collar-escapement-shuttle cavity 154 of collar-escapement mechanism 135 to collar-escapement cavity 132 of collar-escapement mechanism 135 when collar-escapement shuttle 138 is in the second position within collar-escapement-shuttle cavity 154. The preceding subject matter of this paragraph characterizes example 18 of the present disclosure, wherein example 18 also includes the subject matter according to any one of examples 13-16, above.

Collar 140 thereby moves through internal cavity 152 to collar-escapement-shuttle cavity via pressurized fluid from third pressurized-fluid input. As such, collar magazine 130 may be positioned vertically above or vertically below collar-escapement mechanism 135.

Referring generally to FIG. 1 and particularly to, e.g., FIGS. 4B-4H, collar magazine 130 is positioned vertically below collar-escapement mechanism 135. The preceding subject matter of this paragraph characterizes example 19 of the present disclosure, wherein example 19 also includes the subject matter according to example 18, above.

Referring generally to FIG. 1 and particularly to, e.g., FIG. 4A, collar magazine 130 further comprises port 111, communicatively coupling internal cavity 152 of collar magazine 130 and collar-escapement-shuttle cavity 154 of collar-escapement mechanism 135 when collar-escapement shuttle 138 is in the second position within collar-escapement-shuttle cavity 154. The preceding subject matter of this paragraph characterizes example 20 of the present disclosure, wherein example 20 also includes the subject matter according to example 18, above.

Collar 140 thereby moves through port 111 from internal cavity 152 to collar-escapement-shuttle cavity 154 when collar-escapement shuttle 138 is in the second position within collar-escapement-shuttle cavity 154.

Referring generally to FIG. 1 and particularly to, e.g., FIGS. 4B, 4E, and 4F, apparatus 100 also comprises bracket 150, coupled to base 133, and adjustable belt 151, coupled to base 133. The preceding subject matter of this paragraph characterizes example 21 of the present disclosure, wherein example 21 also includes the subject matter according to any one of examples 13-20, above.

Bracket 150 may include a pair of slots through which belt 151 may pass. Belt 151 may be positioned around an operator's waist such that collar source 129 may be attached to the operator in a hands-free fashion. Such a configuration enables the operator to hold collar feeder 102 with two hands, thereby simplifying operation of apparatus 100.

Referring generally to FIG. 1 and particularly to, e.g., FIGS. 4A-4H, collar magazine 130 has a capacity of at least fifty collars. The preceding subject matter of this paragraph characterizes example 22 of the present disclosure, wherein example 22 also includes the subject matter according to any one of examples 9-21, above.

An increased capacity of collar magazine 130 enables the operator to perform many swaging operations without interruption, thereby increasing productivity.

Referring generally to FIG. 1 and particularly to, e.g., FIGS. 4A-4H, collar magazine 130 further comprises removable lid 147. The preceding subject matter of this paragraph characterizes example 23 of the present disclosure, wherein example 23 also includes the subject matter according to any one of examples 9-22, above.

Removable lid 147 may include threads, and collar magazine 130 may include complementary threads such that removable lid 147 screws into collar magazine 130. In another example, removable lid 147 may be press fit into an opening in collar magazine 130. Removable lid 147 enables an operator to refill collar magazine 130 with additional collars all collars have been used.

Referring generally to FIG. 1 and particularly to, e.g., FIGS. 4A-4H, collar magazine 130 is dimensioned such that a ratio of a height of collar magazine 130 to a diameter of collar 140 is about 10:1. The preceding subject matter of this paragraph characterizes example 24 of the present disclosure, wherein example 24 also includes the subject matter according to any one of examples 9-23, above.

Referring generally to FIG. 1 and particularly to, e.g., FIGS. 4A-4H, internal cavity 152 of collar magazine 130 is spiral. The preceding subject matter of this paragraph characterizes example 25 of the present disclosure, wherein example 25 also includes the subject matter according to any one of examples 9-24, above.

A spiral internal cavity 152 eases movement of collar 140 from internal cavity 152 to collar-escapement-shuttle cavity 154 when collar-escapement shuttle 138 is in the second position within collar-escapement-shuttle cavity 154.

Referring generally to FIG. 1 and particularly to, e.g., FIGS. 4A-4H, collar 140 has opening 140A and internal cavity 152 has central axis 152A and is configured to receive collar 140 such that opening 140A of collar 140 is oriented perpendicular to central axis 152A of internal cavity 152 as collar 140 moves along internal cavity 152. The preceding subject matter of this paragraph characterizes example 26 of the present disclosure, wherein example 26 also includes the subject matter according to any one of examples 9-25, above.

As such, collar 140 moves along its outer surface within internal cavity 152. The round shape of collar 140 enables collar 140 to roll along internal cavity 152.

Referring generally to, e.g., FIGS. 1, 2A, and 2B, and particularly to, e.g., FIG. 5 (blocks 502-506), method 500 of delivering collar 140 between fastener 142 and swager 114 is disclosed. Method 500 comprises advancing collar 140 from collar source 129 to collar feeder 102. Collar source 129 is operatively coupled to collar feeder 102 via collar-supply tube 108. Method 500 also comprises presenting collar 140 at outlet 107 of collar feeder 102 concentrically in line with central axis A of fastener 142 and with working axis B of swager 114. Method 500 additionally comprises retaining collar 140 at outlet 107 of collar feeder 102 using at least one resilient flexure 128 of collar feeder 102. The preceding subject matter of this paragraph characterizes example 27 of the present disclosure.

Method 500 provides improved ergonomics for overhead work because collar 140 is presented to the work location concentrically in line with swager 114. Thus, collar 140 is already lined up with the work location.

Continuing to refer generally to FIGS. 1, 2A, and 2B, and particularly to FIG. 5 (block 508), method 500 further comprises advancing collar 140, via collar-supply tube 108, from collar source 129 to collar feeder 102. The preceding subject matter of this paragraph characterizes example 28 of the present disclosure, wherein example 28 also includes the subject matter according to example 27, above.

Collar-supply tube 108 may be operatively coupled to collar source 129 to provide a plurality of collars to one or more resilient flexures 128 of collar feeder 102. Collar source 129 may be remote from collar feeder 102. For example, collar source 129 may be located at the operator's hip rather than at collar feeder 102 of apparatus 100 to decrease the weight of apparatus 100 supported by the operator and to decrease the footprint of apparatus 100 for better access to confined spaces.

Referring generally to, e.g., FIGS. 1, 2A, and 2B, and particularly to, e.g., FIG. 6 (blocks 602-610), method 600 of swaging collar 140 to fastener 142 associated with workpiece W is disclosed. Method 600 comprises presenting collar 140 at outlet 107 of collar feeder 102 concentrically in line with central axis A of fastener 142 and with working axis B of swager 114. Method 600 also comprises retaining collar 140 at outlet 107 of collar feeder 102 using at least one resilient flexure 128 of collar feeder 102. Method 600 additionally comprises installing collar 140 around fastener 142 and releasing collar 140 from at least one resilient flexure 128 by moving swager 114 toward workpiece W along central axis A of fastener 142 to cause outlet 107 of collar feeder 102 to move away from central axis A of fastener 142. Method 600 further comprises swaging collar 140 to fastener 142. The preceding subject matter of this paragraph characterizes example 29 of the present disclosure.

Following the completion of the swage process, the operator pulls apparatus 100 away from workpiece W. Means for biasing 126 slider 122 relative to swager 114 returns collar feeder 102 to its starting position to await the next collar to be fed to resilient flexure 128.

Continuing to refer generally to FIGS. 1, 2A, and 2B, and particularly to FIG. 6 (block 614), moving swager 114 toward workpiece W comprises biasing contact element 112 of collar feeder 102 against workpiece W. The preceding subject matter of this paragraph characterizes example 30 of the present disclosure, wherein example 30 also includes the subject matter according to example 29, above.

In one example, contact element 112 comprises a roller that may be biased against workpiece W in operation. In another example, collar feeder 102 may be configured to cam out of the way of swager 114 pneumatically rather than from mechanical pressure against workpiece W.

Continuing to refer generally to FIGS. 1, 2A, and 2B, and particularly to FIG. 6 (block 616), when contact element 112 is biased against workpiece W and swager 114 is moved relative to workpiece W along central axis A of fastener 142, cam surface 116 of cam assembly 115 guides cam follower 118 of cam assembly 115 along a path located in a plane that is parallel to or contains working axis B of swager 114. The preceding subject matter of this paragraph characterizes example 31 of the present disclosure, wherein example 31 also includes the subject matter according to example 30, above.

Such a movement of cam follower 118 provides visibility of the work location, delivers better access to confined areas due to the reduced footprint of apparatus 100 and the initial alignment of collar feeder 102 with swager 114, and additionally provides an improved bearing surface to contact workpiece W.

Continuing to refer generally to FIGS. 1, 2A, and 2B, and particularly to FIG. 6 (block 612), presenting collar 140 at outlet 107 of collar feeder 102 comprises advancing collar 140, via collar-supply tube 108, from collar source 129 to collar feeder 102. The preceding subject matter of this paragraph characterizes example 32 of the present disclosure, wherein example 32 also includes the subject matter according to any one of examples 29-31, above.

As discussed above, collar-supply tube 108 may be operatively coupled to collar source 129 to provide a plurality of collars to one or more resilient flexures 128 of collar feeder 102. Collar source 129 may be remote from collar feeder 102. For example, collar source 129 may be located at the operator's hip rather than at collar feeder 102 of apparatus 100 to decrease the weight of apparatus 100 supported by the operator and to decrease the footprint of apparatus 100 for better access to confined spaces.

Examples of the present disclosure may be described in the context of aircraft manufacturing and service method 1100 as shown in FIG. 7 and aircraft 1102 as shown in FIG. 8. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus (es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of delivering a collar between a fastener and a swager, the method comprising steps of:
    advancing the collar from a collar source to a collar feeder, wherein the collar source is operatively coupled to the collar feeder via a collar-supply tube;
    presenting the collar at an outlet of the collar feeder concentrically in line with a central axis of the fastener and with a working axis of the swager; and
    retaining the collar at the outlet of the collar feeder using at least one resilient flexure of the collar feeder.

2. The method according to claim 1, further comprising advancing the collar, via the collar-supply tube, from the collar source to the collar feeder.

3. The method according to claim 1, wherein:
    the collar has an opening and an internal cavity of a collar magazine of the collar source has a central axis; and
    advancing the collar from the collar source to the collar feeder comprises receiving the collar such that the opening of the collar is oriented perpendicular to the central axis of the internal cavity as the collar moves along the internal cavity of the collar magazine.

4. The method according to claim 1, wherein:
    the collar source comprises:
        a collar magazine, comprising an internal cavity that comprises an outlet; and
        a collar-escapement mechanism, operatively coupled to the collar magazine; and
    the step of advancing the collar from the collar source to the collar feeder comprises moving a collar-escapement shuttle from a first position to a second position within a collar-escapement-shuttle cavity of the collar-escapement mechanism.

5. The method according to claim 4, further comprising positioning the collar magazine vertically above the collar-escapement mechanism to cause the collar to be transferred, via gravity, from the internal cavity of the collar magazine to the collar-escapement-shuttle cavity of the collar-escapement mechanism when the collar-escapement shuttle is in the first position within the collar-escapement-shuttle cavity and to cause the collar to be transferred, via gravity, from the collar-escapement-shuttle cavity of the collar-escapement mechanism to a collar-escapement cavity of the collar-escapement mechanism when the collar-escapement shuttle is in the second position within the collar-escapement-shuttle cavity.

6. The method according to claim 4, further comprising:
    operatively coupling a first pressurized-fluid input with a pneumatic cylinder, comprising a piston, attached to the collar-escapement shuttle; and
    operatively coupling a second pressurized-fluid input with a collar-escapement cavity of the collar-escapement mechanism and with the collar-supply tube.

7. The method according to claim 6, further comprising operatively coupling a third pressurized-fluid input with the collar magazine to cause the collar to be transferred, via pressurized fluid, from the internal cavity of the collar magazine to the collar-escapement-shuttle cavity of the collar-escapement mechanism when the collar-escapement shuttle is in the first position within the collar-escapement-shuttle cavity and to cause the collar to be transferred, via pressurized fluid, from the collar-escapement-shuttle cavity of the collar-escapement mechanism to the collar-escapement cavity of the collar-escapement mechanism when the collar-escapement shuttle is in the second position within the collar-escapement-shuttle cavity.

8. The method according to claim 6, wherein:
    the step of advancing the collar from the collar source to the collar feeder comprises pulling a trigger of a handle of a chassis;
    the chassis is coupled to the swager; and
    the trigger is configured to selectively pneumatically couple the pneumatic cylinder to a pressurized-fluid source to cause the piston of the pneumatic cylinder to move the collar-escapement shuttle from the first position to the second position or from the second position to the first position within the collar-escapement-shuttle cavity.

9. The method according to claim 1, wherein:
    the collar source comprises:
        a collar magazine, comprising an internal cavity that comprises an outlet;
        a collar-escapement mechanism, operatively coupled to the collar magazine; and
        a base, coupled to the collar-escapement mechanism; and
    the method further comprises a step of removably coupling the collar magazine to the base.

10. The method according to claim 9, wherein:
    the collar magazine further comprises shank twist-lock elements;
    the base comprises receiver twist-lock elements; and
    the step of removably coupling the collar magazine to the base comprises receiving the shank twist-lock elements of the collar magazine by the receiver twist-lock elements to removably couple the collar magazine to the base such that the outlet of the collar magazine is aligned with a collar-escapement-shuttle cavity of the collar-escapement mechanism when the collar magazine is coupled to the base.

11. The method according to claim 9, further comprising removably coupling the collar magazine to the base at a location remote from the collar feeder.

12. A method of swaging a collar to a fastener, associated with a workpiece, the method comprising steps of:
    presenting the collar at an outlet of a collar feeder concentrically in line with a central axis of the fastener and with a working axis of a swager;
    retaining the collar at the outlet of the collar feeder using at least one resilient flexure of the collar feeder;
    installing the collar around the fastener and releasing the collar from the at least one resilient flexure by moving the swager toward the workpiece along the central axis of the fastener to cause the outlet of the collar feeder to move away from the central axis of the fastener; and
    swaging the collar to the fastener.

13. The method according to claim 12, wherein the step of moving the swager toward the workpiece comprises biasing a contact element of the collar feeder against the workpiece.

14. The method according to claim 13, wherein, when the contact element is biased against the workpiece and the swager is moved relative to the workpiece along the central axis of the fastener, a cam surface of a cam assembly guides a cam follower of the cam assembly along a path located in a plane that is parallel to or contains the working axis of the swager.

15. The method according to claim 12, wherein the step of presenting the collar at the outlet of the collar feeder comprises a step of advancing the collar, via a collar-supply tube, from a collar source to the collar feeder.

16. The method according to claim 15, wherein:
the collar has an opening;
an internal cavity of a collar magazine of the collar source has a central axis; and
the step of advancing the collar from the collar source to the collar feeder comprises receiving the collar, such that the opening of the collar is oriented perpendicular to the central axis of the internal cavity as the collar moves along the internal cavity of the collar magazine.

17. The method according to claim 15, wherein:
the collar source comprises:
  a collar magazine, comprising an internal cavity that comprises an outlet; and
  a collar-escapement mechanism, operatively coupled to the collar magazine; and
the step of advancing the collar from the collar source to the collar feeder comprises moving a collar-escapement shuttle from a first position to a second position within a collar-escapement-shuttle cavity of the collar-escapement mechanism.

18. The method according to claim 17, further comprising removably coupling the collar magazine to a base coupled to the collar-escapement mechanism.

19. The method according to claim 18, further comprising removably coupling the collar magazine to the base at a location remote from the collar feeder.

20. The method according to claim 12, further comprising moving the collar feeder away from the workpiece after swaging the collar to the fastener.

* * * * *